(12) United States Patent
Walker et al.

(10) Patent No.: US 7,069,732 B2
(45) Date of Patent: Jul. 4, 2006

(54) METHOD AND APPARATUS FOR CONTROLLING HEAT TRANSFER FOR A FLUID IMMERSED VESSEL

(75) Inventors: Darrel J. Walker, Mt. Pleasant, MI (US); Wayne W. Smith, Mt. Pleasant, MI (US)

(73) Assignee: The Delfield Company, Mt. Pleasant, MI (US)

( * ) Notice: Subject to any disclaimer, the term of this patent is extended or adjusted under 35 U.S.C. 154(b) by 0 days.

(21) Appl. No.: 10/874,738

(22) Filed: Jun. 23, 2004

(65) Prior Publication Data

US 2005/0284172 A1    Dec. 29, 2005

(51) Int. Cl.
*F25D 23/12* (2006.01)
(52) U.S. Cl. ............................................. 62/99; 62/258
(58) Field of Classification Search .................. 62/258, 62/430–439, 458, 99
See application file for complete search history.

(56) References Cited

U.S. PATENT DOCUMENTS

| | | | | |
|---|---|---|---|---|
| 1,610,626 A | * | 12/1926 | Smith | 62/185 |
| 1,932,694 A | * | 10/1933 | Gray | 62/253 |
| 2,871,675 A | * | 2/1959 | Cornelius | 62/258 |
| 3,411,317 A | * | 11/1968 | Swenson et al. | 62/258 |
| 5,921,096 A | * | 7/1999 | Warren | 62/185 |
| 6,085,535 A | | 7/2000 | Richmond et al. | 62/258 |
| 6,145,333 A | | 11/2000 | Richmond et al. | 62/258 |
| 6,202,432 B1 | * | 3/2001 | Haasis | 62/258 |
| 6,434,961 B1 | | 8/2002 | Richmond et al. | 62/258 |
| 6,557,363 B1 | * | 5/2003 | Haasis et al. | 62/258 |
| 6,910,347 B1 | * | 6/2005 | Monroe et al. | 62/258 |

* cited by examiner

*Primary Examiner*—William E. Tapolcai
(74) *Attorney, Agent, or Firm*—Ohlandt, Greeley, Ruggiero & Perle, L.L.P.

(57) ABSTRACT

A temperature control system for maintaining a food product at an acceptable temperature having a pan with a thermally conductive wall, a first member surrounding the thermally conductive wall, and a channel being formed between the first member and the thermally conductive wall. The temperature control system has a fluid in the channel for contacting the pan at a first location and a refrigeration coil being connected to a portion of the thermally conductive wall for cooling the pan. The temperature control system further has a second member for surrounding a first portion of the thermally conductive wall. The second member and the fluid maximize heat transfer at a first portion of the thermally conductive wall. The second member minimizes heat transfer at a second location of the thermally conductive wall.

25 Claims, 3 Drawing Sheets

METHOD AND APPARATUS FOR CONTROLLING HEAT TRANSFER FOR A FLUID IMMERSED VESSEL

FIELD OF THE INVENTION

This invention relates to a refrigeration system used in the food service industry. More particularly, the present invention relates to a serving pan assembly that is capable of maintaining food at a low temperature for an extended period of time, and at a uniform temperature, in the pan.

BACKGROUND OF THE INVENTION

Refrigeration systems for hospitality usage, catering and food service usage are known in the art. One such use is a salad bar. Often salad lettuce and related items are stored in walk in refrigeration systems for a period of time to maintain freshness. During business hours when customers desire salad, the food service personnel or providers will load the salad into a refrigeration assembly for selective access by the customers. In one type of salad bar arrangement, shallow pans are placed in a number of notches or apertures of a cabinet or service counter. Containers are placed in the notches. Then, at the appropriate time, the salad is placed in the chilled containers. The refrigeration assembly will have a cooling device therein. The cooling device will cool the containers and the food contents of the containers.

U.S. Pat. No. 5,247,807 to Jarman and U.S. Pat. No. 4,989,419 to Brando et al. disclose such refrigeration assemblies. Jarman discloses a container in a chamber that has refrigerated coils. The coils surround virtually the entire surface of the container. However, this system is defective in its operation, as the refrigerated coils will cool the contents in a non-uniform manner. Although, the refrigerated coils will cool a top most portion of the container a suitable amount, the refrigeration coils often cool a bottom most portion of the container an excessive amount. This excessive cooling is detrimental to the freshness and the overall taste of the food.

Brando discloses an assembly that has a chamber. The chamber is filled with a gel. The gel keeps a pan cool for an extended period of time. However, like the previous discussed reference, due to an amount of heat transfer to ambient at a top most portion of the pan where the pan is open, the cooling device often cools a bottom most portion of the container an excessive amount relative to the top most portion. This excessive cooling thus creates a non-uniform cooling of the pan. This non-uniformity is detrimental, adverse to the taste of the food, and conducive to spoilage, as the food will be cooled excessively in one location and not enough in a second location. Accordingly, there is a need for a refrigeration assembly that is capable of a substantially uniform cooling of the food in the pan.

There is a further need for a refrigeration assembly that has a pan that can store food therein at a uniform temperature throughout the pan.

There is a need for such a refrigeration assembly that has a pan that has an upper portion and a lower portion with a number of refrigeration coils that contact the upper portion.

There is a need for a refrigeration assembly that has a pan that is made from a thermally conductive material with a gel that selectively surrounds the thermally conductive material for maximum cooling in certain preselected areas of the pan.

There is a need for such a refrigeration assembly that can be easily installed in a food serving counter.

There is a need for such a refrigeration assembly that has an insulating member that selectively covers a portion of a pan for minimum cooling in a certain preselected area of the pan.

SUMMARY OF THE INVENTION

A temperature control system for maintaining a food product at an acceptable temperature of the present invention has a pan with a thermally conductive wall and a first member surrounding the thermally conductive wall. The temperature control system also has a channel formed between the first member and the thermally conductive wall and fluid in the channel for contacting the pan at a first location. The temperature control system further has a refrigeration coil connected to a portion of the thermally conductive wall for cooling the pan and a second member for surrounding a first portion of the thermally conductive wall. The second member and fluid maximizes heat transfer at a first portion of the thermally conductive wall, and the second member minimizes heat transfer at a second location of the thermally conductive wall.

In a first embodiment, the temperature control system has the first member formed from an insulating material.

In another embodiment, the temperature control system has the channel with a first width at a first location and a second thinner width at a second location for maximum heat transfer at the first location and a minimum heat transfer at the second thinner location.

In another embodiment, the temperature control system has the second thinner location being at a bottom most portion of the pan.

In a further embodiment, the temperature control system has the refrigeration coil surrounding a top of the pan.

In another embodiment, the temperature control system has the pan being a serving pan for holding edible substances.

In another embodiment, the temperature control system has the fluid selected from the group consisting of a glycol medium, water, and any combinations thereof.

In a further embodiment, the temperature control system has the fluid transferring heat.

In a still another embodiment, the temperature control system has the refrigeration coil being tubing formed from a thermally conductive material having an interior with a coolant circulating through the tubing.

In another embodiment, the temperature control system has the first member being insulation.

BRIEF DESCRIPTION OF THE FIGURES

Other and further objects, advantages and features of the present invention will be understood by reference to the following specification in conjunction with the accompanying figures, in which like reference characters denote like elements of structure and.

DESCRIPTION OF THE PREFERRED EMBODIMENT

Figure 1:
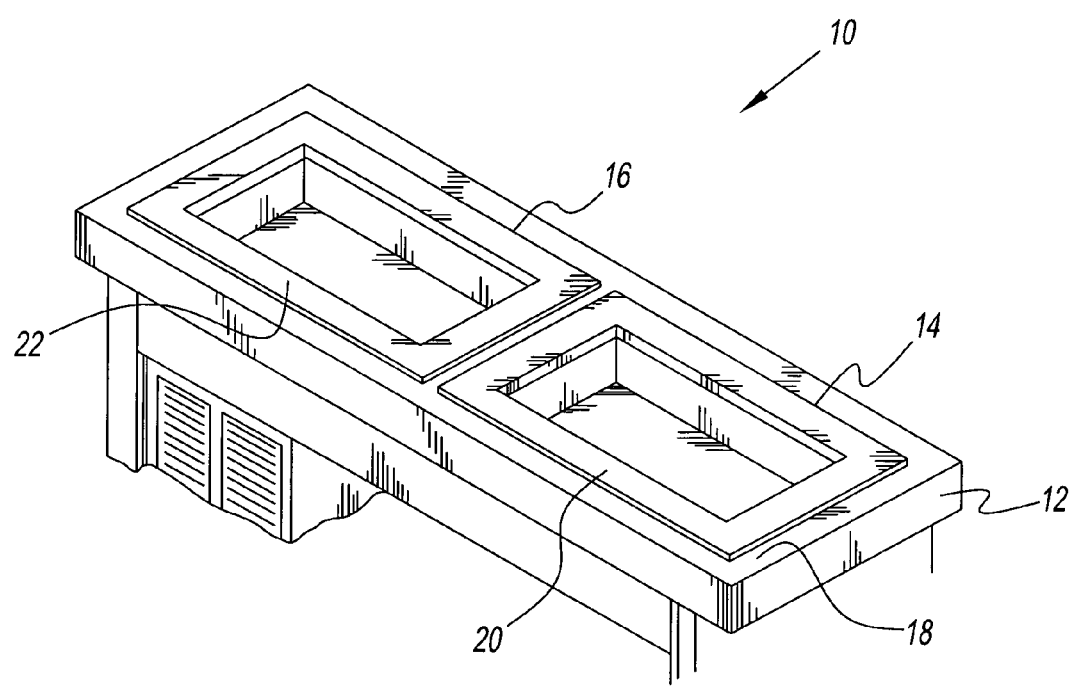
FIG. 1 is a perspective view, in part, of the refrigeration assembly of the present invention.

With reference to FIG. 1, there is provided a refrigeration assembly 10 of the present invention. Most preferably, the refrigeration assembly 10 is disposed in a counter type structure 12. Preferably, the counter type structure 12 has a cooling device therein (not shown). The cooling device 12 may be a removable cooling device or formed in an integral manner with the refrigeration assembly 10. One skilled in the art should appreciate that the cooling device may be any cooling device known in the art. The counter type structure 12 preferably has a first orthogonal shaped aperture 14 and a second orthogonal shaped aperture 16 in a top 18 of the counter type structure. The apertures 14, 16 are preferably complementary shaped relative to fit another shaped member thereon.

Figure 2:
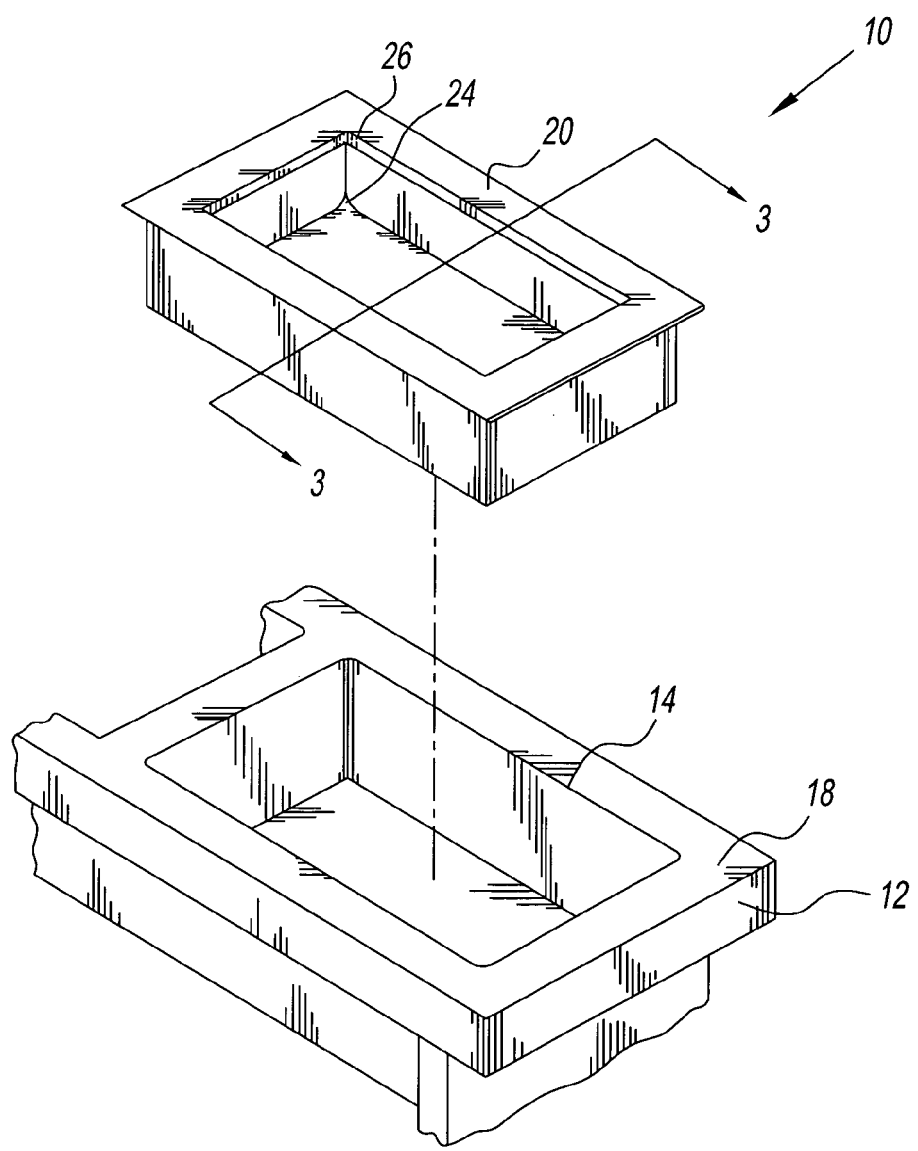
FIG. 2 is a perspective view, in part, of the first serving pan exploded from the refrigeration assembly of FIG. 1.

The refrigeration assembly 10 further has a first pan 20 and a second pan 22. The first pan 20 may be selectively disposed in the first orthogonal shaped aperture 14 and the second pan 22 may also be selectively disposed in the second orthogonal shaped aperture 16. One skilled in the art should appreciate that the counter type structure 12 may be formed with any desired length so as to accommodate any number of pans and be formed with any number of apertures depending on food served. Referring to FIG. 2, there is shown a partially exploded view of the first pan 20 being selectively removed from the counter type structure 12 and above the counter type structure. In this manner, the operator may selectively remove the first pan 20 or the second pan 22 by lifting the first pan and/or the second pan to remove, clean or refill the desired pan with food or alternatively replace the first pan and/or the second pan with another third pan of food. Optionally, the first pan 20 may have a first cover (not shown) disposed thereon to selectively cover the first pan. One skilled in the art should appreciate that other relatively smaller pans (relative to the first pan 20 and the second pan 22) may be optionally placed in the first pan and second pan for allowing more food to be stored in the refrigeration assembly 10. Also, one skilled in the art should further appreciate that instead of cooling, the assembly 10 may be modified slightly to store heated food products instead of cooled or chilled food products.

In operation, the consumer often will purchase food from the provider in a self-serve environment. The consumer will manually take a plate, lift the cover, and load the hot or cold food onto the plate as is known in the art. During the course of the day or evening business hours, it is important to maintain the food at a preselected acceptable temperature. This acceptable temperature preferably ensures a freshness of the food, ensures a taste of the food, ensures a quality of the food and thus maximizes profits for the provider. The preferred desired temperature of the food therein for a cold storage is in a range that includes about thirty-three degrees Fahrenheit to about forty-one degrees Fahrenheit. The preferred desired temperature of the food therein for non-cooled or ambient food product storage is in a range that includes about eighty-six degrees Fahrenheit or lower.

A known problem in the art is that the food contents of the pan are cooled in a non-uniform manner. The non-uniform manner is problematic for a number of reasons. First, if the cooling device is improperly placed, this non-uniform cooling may result in food at a first location 24 being cooled more than at a second location 26 as shown in FIG. 2. This may result in the food at the first location 24 being cooled excessively thus negatively effecting the food as discussed above. Secondly, to prevent the food at the first location 24 from cooling excessively, the provider may adjust and lower the cooling device. This lowering of the cooling device will thus inadvertently allow the food at the second location 26 to be warmed an amount due to heat transfer to ambient. This is potentially harmful and may induce spoilage or negatively affect a taste of the food at the second location 26. Thirdly, due to the geometry of the pan 20 and the food product being located stacked in the pan it has been observed that some locations in the pan will transfer heat at different rates per unit time relative to other locations in the pan.

The second location 26 at the top near the opening of the first pan 20 may require increased cooling per unit time because of the exposure to the warm ambient air. Another first location 24 at the bottom of the first pan 20 may require less cooling per unit time due to the fact that the food at the bottom of the pan may be better insulated attributed to the food stacked on topside thereof. Preferably, the temperature of the food at a maximum heat transfer location in the pan 20 or at the location near the opening or second location 26 is preferably set at about a maximum of thirty-three degrees Fahrenheit. The preferred temperature of the food at a minimum heat transfer location of the pan 20, or first location 24 where the food is stacked on top of itself is about a minimum of forty-one degrees Fahrenheit. In other word, the food preferably should get no colder than thirty-three degrees and no warmer than about forty-one degrees Fahrenheit in any location in the first pan 20.

The present preferably obviates these concerns and preferably cools the pan in an improved manner relative to the prior art. The refrigeration assembly 10 permits food contents in different locations of a storage device (such as a serving pan) to be maintained at an acceptable temperature for consumption by a customer over an extended period of time.

Figure 3:
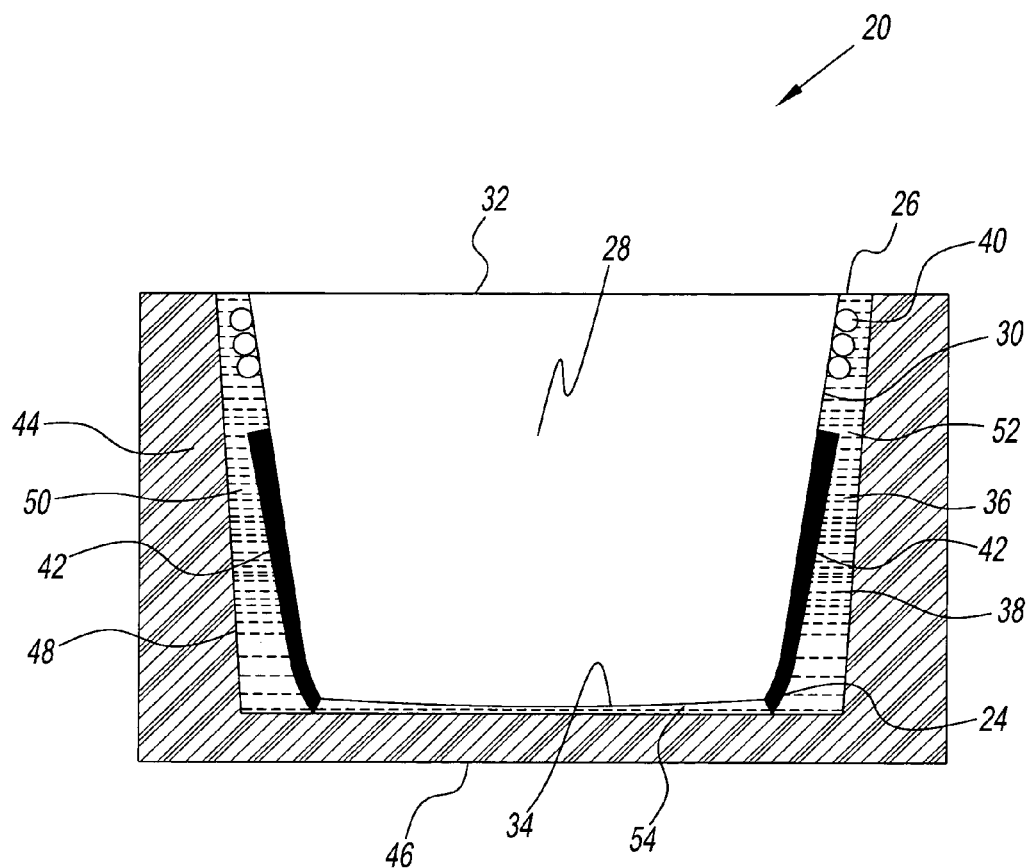
FIG. 3 is a cross sectional view of the first serving pan of the present invention along line 3—3 of FIG. 2.

Referring to FIG. 3, there is shown a cross sectional view of the first pan 20 along line 3—3 of FIG. 2. The first pan 20 preferably has a space 28 for holding an edible hot or cold food substance, for example a chilled lettuce, meats, poultry, cheese, sauces, other vegetables, and the like. One skilled in the art should appreciate that one or more additional serving pans having a diameter in a range of one sixteenth of an inch to about three eighths of an inch may be selectively placed in the space 28 of the first pan 20. The first pan 20 may be made from stainless steel, aluminum, a copper, a tin, a composite material, a thermally conductive material, and any combinations thereof. However, most preferably the first pan 20 is made from either stainless steel or aluminum. The first pan 20 is shown as being generally rectangular, however one skilled in the art should appreciate that the first pan and/or the second pan 22 preferably may have any shape known in the art, and the first pan and the second pan may have different shapes relative to one another. The first pan 20 further has an outer wall 30. The outer wall 30 preferably transfers heat from the food into the refrigeration assembly 10 so as to maintain the food in the space 28 fresh and at an acceptable temperature for sale.

The outer wall 30 preferably has a top side 32 and a bottom side 34 opposite the top side. The top side 32 is most preferably adjacent to an edge of the first pan 20 and the bottom side 34 is preferably spaced away therefrom. The top side 32 preferably is adjacent to an opening of the first pan 20 where the user will selectively remove the one or more foods from the space 28 of the first pan 20 for consumption. Optionally, the top side 32 may further have a lip (not shown) to engage the counter type structure 12. The lip may further aid in retaining the first pan 20 in either the first or the second orthogonal shaped apertures 14, 16.

Preferably, the top side 32 and the food contents of the first pan 20 being adjacent the top side will transfer heat more rapidly that a remainder of the food contents in the first pan. The food contents will transfer heat more rapidly because the top side 32 is intermittently exposed to ambient conditions when the cover is removed by the consumer for access to the food. Contrary, the food contents that are in the first pan 20 and are adjacent to the bottom side 34 will not transfer heat as rapidly per unit time relative to the food adjacent to the top side 32. The food adjacent the bottom side 34 will not transfer heat as rapidly because this food is very well insulated by an amount of food being stacked thereon.

The refrigeration system 10 of the present invention remedies this know problem in the art. Most teachings of the prior art will increase an amount of refrigerant and cooling to remedy any problems with any assembly. However, this approach is incorrect and misguided. The refrigeration system 10 further has a second compartment 36. The second compartment 36 preferably is disposed to surround the space 28 of the first pan 20. Most preferably, the second compartment 36 is filled with a chillable fluid 38. Preferably, the chillable fluid 38 is a glycol medium. Most preferably, the chillable fluid 38 is a propylene glycol. In another embodiment, the chillable fluid 38 may be ice, water, chilled water and any other material for which to transfer heat from the food to maintain the freshness of the food.

The refrigeration system 10 preferably has a number of refrigeration coils 40. Preferably, the number of refrigeration coils 40 are a cylindrical shaped tubing that has a coolant therein that is wound along the top side 32 of the first pan 20. The coolant may be a refrigerant or other similar coolant and is wound and connected to the top side 32 of the first pan 20. The coolant may be an R22 refrigerant, an R134 refrigerant, an R404 a refrigerant or any other known refrigerant. As one can understand from FIG. 3, most preferably three loops of refrigeration coils 40 are wound around the top side 32 of the first pan 20. The number of loops obviously depends on the size of the first pan 20 and the food product desired to be cooled in the first pan. Alternatively, four loops also may be used and is within the scope of the present invention. This top side 32 location of the number of refrigeration coils 40 has an unexpected benefit that is contrary to the teachings of the prior art.

Typically, the prior art teaches more coils for more cooling per unit time. However, it has been observed that an optimal amount of coils is preferred, not simply adding more refrigeration coils. It has been observed that food at the top side 32 has a greater heat transfer rate to ambient per unit time than the food at the bottom side 34 of the first pan 20 attributed to the opening. This difference allows the contents of the bottom side 34 of the first pan 20 to become too chilled if the operation of the cooling device is increased to compensate for the heat transfer. In contrast, if operation of the cooling device is not increased to compensate for the heat transfer the food contents of the top side 32 will remain less chilled relative to those on the bottom side 34 because of the selective opening and closing of the first pan 20 by the consumer.

The refrigeration system 10 of the present invention preferably further has a first insulating member 42. The first insulating member 42 is preferably disposed surrounding a portion of the first pan 20, spaced near the bottom side 34 thereof. The first insulating member 42 preferably is a self-adhesive backed insulating foam and has a thickness and is connected to an outer surface of the outer wall 30 of the first pan 20 in the second compartment 36. One skilled in the art should appreciate that various connection methods may be used and is within the scope of the present invention. One skilled in the art should appreciate that the thickness is preferably about one eighth of an inch to about one fourth of an inch however the thickness may be varied depending upon the food sought to be stored in the first pan 20. Preferably, an adhesive material (not shown) is preferably disposed thereon to connect the first insulating member 42 to the first pan 20. The adhesive material may be any adhesive known in the art that does not break down or react with the glycol medium. Alternatively, the first insulating member 42 may be any other insulating material known in the art. Preferably, the first insulating member 42 is disposed surrounding a preselected portion of the bottom side 34 of the first pan 20 for preventing the food in the bottom most side 34 of the first pan 20 from cooling excessively and thus spoiling a taste of the food. The first insulating member 42 is tightly disposed thereon and is disposed about half way to about three quarters of the distance from the bottom most side 34 of the first pan 20 toward the top.

The refrigeration assembly 10 further has a second insulating member 44. Most preferably, the second insulating member 44 is made from polyurethane foam. Alternatively, the second insulating member 44 preferably is formed from a different insulating material as the first insulating member 42 because of the exposure of the first insulating member to the glycol medium. The second insulating member 44 preferably has a bottom side 46 and a surrounding lateral side 48. The bottom side 46 preferably has a first thickness and the surrounding lateral side 48 preferably has a second thickness. The second thickness is less than the first thickness so as to allow a greater heat transfer per unit time out of a bottom side 46 of the first pan 20 relative to a lateral side of the outer wall 30 of the first pan 20. In this manner, the food contents adjacent to the bottom side 46 are prevented from being cooled an excessive amount while the food contents stacked above the bottom side and adjacent to the surrounding lateral side 48 are cooled to an acceptable temperature for consumption. The first and the second thickness may be variable and can vary from the same size to about a third of the size thereof depending on the configuration of the first pan 20 and the food product being disposed therein.

Preferably, the second insulating member 44 has a generally orthogonal shape and surrounds the space 28 of the first pan 20. The second insulating member 44 preferably has a suitable geometry and forms the second compartment 36. The second compartment 36 has a differently sized width surrounding the outer wall 30 relative to the bottom side 34 of the first pan 20. In this manner, the second compartment 36 selectively controls an amount of chillable fluid 38 that contacts the first pan 20 and thus selectively controls an amount of cooling of the bottom side 34 and the outer wall 30 of the first pan 20. The chillable fluid 38 is allowed to traverse in the second compartment 36 to selectively cool portions of the first pan 20. The second insulating member 44 preferably is any insulation known in the art that is also resilient to surround the first pan 20 and allow the first pan to rest therein with the chillable fluid 38 in the second compartment 38. Preferably, the second insulating member 42 prevents heat from being transferred to the contents of the first pan 20 and allows the first pan to remain cool for a prolonged period of time. The second compartment 36 that is formed between the second insulating member 42 and the first pan 20 further has an irregular shape to provide relatively more insulation in a first location and relatively less insulation to a second location of the first pan 20. The first and the second compartments 36, 38 preferably may have a thickness of about three eighths of an inch to about three quarters of an inch.

The second compartment 36 has a first lateral portion 50, a second lateral portion 52, and a bottom portion 54. Each of the first lateral portion 50, the second lateral portion 52, and the bottom portion 54 has a width that varies from each of these other locations so as to vary an amount of fluid that surrounds the pan in preselected portion of the pan. The variance controls heat transfer at the first lateral portion 50, the second lateral portion 52 and the bottom portion 54. One skilled in the art should appreciate that a synergistic affect of the present invention is that the assembly preferably selectively limits an amount of glycol medium that contacts the first pan 20 to decrease an amount of heat transfer in a first location and selectively increases an amount of heat transfer at another location different from the first location. This will allow one location to be at a temperature of about 33 degrees Fahrenheit and another location to be at a temperature of about 41 degrees Fahrenheit.

Referring again to FIG. 3, the chillable fluid 38 preferably traverses through each the first lateral portion 50, the second lateral portion 52, and the bottom portion 54. The width of the bottom portion 54 is preferably about three fourths of an inch, which is less than that of the first lateral portion 50 and the second lateral portion 52. This facilitates the food contents at the bottom side 34 of the first pan 20 being maintained at a uniform temperature relative to the food contents of the top side 32 for an extended period of time. Additionally, the first lateral portion 52 and the second lateral portion 54 preferably narrow in width from the top side 32 of the first pan 20 to adjacent the bottom side 34 of the first pan. The present invention provides for maintaining food products at a much lower temperature than prior art refrigeration systems without fear of spoiling food that would otherwise come in contact with the refrigeration coil along an entire lateral side of the outer wall 30. As a result food product may be maintained for more uniform and lower temperatures for an extended period of time.

The present invention having been thus described with particular reference to the preferred forms thereof, it will be obvious that various changes and modifications may be made therein without departing from the spirit and scope of the present invention as defined in the appended claims.

What is claimed is:

1. A temperature control system for cooling food at an optimal temperature, the temperature control system comprising:
    a pan having an opening, a lateral side wall, and a bottom for holding the food, said lateral side wall having a first insulation member for surrounding a portion;
    a cooling device for cooling said opening at a first rate, said cooling device for cooling said bottom at a second rate, wherein said first rate is greater than said second rate; and
    a second insulation member for surrounding said lateral side wall and said first insulation member, said lateral wall and said second insulation member define a channel, said channel being filled with a glycol medium for cooling said pan,
    wherein said channel has a first width in a first location adjacent said lateral side wall, and wherein said channel has a second width in a second location adjacent said bottom, said first width being greater than said second width.

2. The temperature control system of claim 1, wherein said cooling device is a plurality of refrigeration coils being wound around said lateral side wall in spaced relation to said opening.

3. The temperature control system of claim 1 wherein said pan is removably insertable into a refrigeration assembly.

4. A temperature control system for maintaining a food product at an acceptable temperature, the temperature control system comprising:
    a pan having a thermally conductive wall;
    a first member surrounding said thermally conductive wall;
    a channel being formed between said first member and said thermally conductive wall;
    a fluid being in said channel, said fluid for contacting said pan at a first location;
    a refrigeration coil being connected to a portion of said thermally conductive wall for cooling said pan; and
    a second member for surrounding a first portion of said thermally conductive wall, wherein said second member and said fluid maximizes heat transfer at a first portion of said thermally conductive wall, and wherein said second member minimizes heat transfer at a second location of said thermally conductive wall.

5. The temperature control system of claim 4, wherein said first member is formed from an insulating material.

6. The temperature control system of claim 4, wherein said channel has a first width at said first location and a second thinner width at a second location for maximum heat transfer at said first location, and a minimum heat transfer at said second thinner location.

7. The temperature control system of claim 6, wherein said second thinner location is at a bottom most portion of said pan.

8. The temperature control system of claim 4, wherein said refrigeration coil is disposed surrounding a top of said pan.

9. The temperature control system of claim 4, wherein said pan is a serving pan for holding edible substances.

10. The temperature control system of claim 4, wherein said fluid is selected from the group consisting of a glycol medium, water, and any combinations thereof.

11. The temperature control system of claim 4, wherein said fluid transfers heat.

12. The temperature control system of claim 4, wherein said refrigeration coil is tubing formed from a thermally conductive material, said tubing having an interior, said interior having a coolant circulating through said tubing.

13. The temperature control system of claim 4, wherein said first member is insulation.

14. The temperature control system of claim 4, wherein said second member is insulation.

15. A refrigeration system for maintaining food at a low temperature comprising:
    a pan for placing the food therein;
    an outer wall surrounding said pan for forming a compartment therebetween;
    a chillable fluid material being located in said compartment;
    a refrigeration coil being connected to a top of said pan for chilling said pan and said food therein;
    a first insulation member being connected to a first location of said pan; and
    a second insulation member being connected to a second location of said pan, wherein said compartment has a first thickness at a lateral side of said pan, and a second thickness at a bottom of said pan, wherein the food located in the pan is cooled in a substantially uniform manner,
    wherein said second insulation member is disposed between said compartment and said pan.

16. The refrigeration system of claim 15, wherein said refrigeration coil is wound around said top of said pan in a number of loops.

17. The refrigeration system of claim 15, wherein said chillable fluid material is selected from the group consisting of a glycol medium, water, and any combinations thereof.

18. The refrigeration system of claim 17, wherein said first insulation member is disposed surrounding said pan in spaced relation under said refrigeration coil being wound around said top of said pan.

19. The refrigeration system of claim 15, wherein said first insulation member surrounds said compartment.

20. The refrigeration system of claim 15, wherein said refrigeration coil is tubing formed from a thermally conductive material, said tubing having an interior, said interior having a coolant circulating through said tubing.

21. A refrigeration system for maintaining food at a low temperature comprising:
   a pan having a first compartment for placing food in said first compartment, said pan having an opening, a lateral side wall having a first top side and a second bottom side, and a base;
   a first insulating member surrounding said lateral side wall of said pan for forming a compartment therebetween, said compartment having a first thickness at a first location and a second thickness at said second location;
   a chillable fluid material being located in said compartment, said chillable fluid material being selected from the group consisting of a glycol medium, water, and any combinations thereof;
   a refrigeration coil having a tubing with an interior, said interior having a refrigerant therein, said refrigeration coil being wound around said lateral side wall at said first top side for chilling said pan and said food in said first compartment; and
   a second insulation member being wound around said pan at said second bottom side for minimizing heat transfer to said chillable fluid material from said food, wherein said first compartment has a minimum thickness at said base for minimizing heat transfer from said chillable fluid material from said food, and wherein said refrigeration coil maximizes heat transfer from said food at said first top side.

22. The refrigeration system of claim 12, further comprising a table having an aperture thereon, wherein said first insulating member surrounding said lateral side wall of said pan is removably insertable in said aperture, said table for serving chilled edible food at an acceptable temperature for a predetermined amount of time.

23. A method of cooling a fluid immersed vessel having a base, an opening, and a surrounding lateral side with a top and a bottom, the method comprising:
   cooling the top of the surrounding lateral side;
   cooling a fluid surrounding said lateral side in a compartment surrounding said lateral side and said base;
   insulating said bottom of said lateral side of said pan; and
   selectively contacting said fluid to said pan, wherein maximum contact occurs at said top, and wherein minimum contact occurs on said base of said pan,
   wherein said insulating step is provided by a first insulating member being disposed between said lateral side and said fluid.

24. The method of claim 23, wherein said cooling step provided by a plurality of refrigerated coils having a coolant therein.

25. A temperature control system for maintaining a food product at an acceptable temperature, the temperature control system comprising:
   a pan having a thermally conductive wall with a top and a bottom, the food product transferring heat to ambient at said top at a first rate of heat transfer and the food product transferring heat at said bottom at a second rate of heat transfer being less than said first rate;
   a first insulating member surrounding said thermally conductive wall;
   a channel being formed between said first member and said thermally conductive wall, said channel having a first width at said top and a second width at said bottom;
   a fluid being in said channel, said fluid for contacting said pan at said top and said bottom;
   a refrigeration coil being connected to said top of said thermally conductive wall for cooling the food product in said pan, said refrigeration coil being wound in a plurality of loops and being connected to a cooling device; and
   a second insulating member for surrounding a portion of said thermally conductive wall adjacent said bottom, wherein the temperature of the food product is no less than thirty three degrees Fahrenheit adjacent said top, and wherein the temperature of the food product is no greater than forty one degrees Fahrenheit adjacent to said bottom.

* * * * *